(12) United States Patent
Benson

(10) Patent No.: US 7,044,308 B2
(45) Date of Patent: May 16, 2006

(54) APPARATUS FOR THE REMOVAL OF SUSPENDED SOLIDS AND ENTRAINED OIL FROM AN AQUEOUS SOLUTION

(76) Inventor: Allan Clarke Benson, 20190 S. Mesquite Mesa Pl., Vail, AZ (US) 85641

( * ) Notice: Subject to any disclaimer, the term of this patent is extended or adjusted under 35 U.S.C. 154(b) by 0 days.

(21) Appl. No.: 10/163,974

(22) Filed: Jun. 5, 2002

(65) Prior Publication Data

US 2003/0226802 A1 Dec. 11, 2003

(51) Int. Cl.
*B01D 17/028* (2006.01)
*B01D 21/02* (2006.01)

(52) U.S. Cl. .................. 210/521; 210/532.1; 210/534; 210/540; 210/DIG. 5

(58) Field of Classification Search .............. 210/521, 210/532.1, 534, 535, 538, 540, DIG. 5
See application file for complete search history.

(56) References Cited

U.S. PATENT DOCUMENTS

| | | | | |
|---|---|---|---|---|
| 2,673,451 A | * | 3/1954 | Gariel | 210/521 |
| 4,123,365 A | * | 10/1978 | Middelbeek | 210/540 |
| 4,160,737 A | * | 7/1979 | Pielkenrood | 210/540 |
| 4,257,895 A | * | 3/1981 | Murdock | 210/532.1 |
| 4,980,070 A | * | 12/1990 | Lieberman | 210/DIG. 5 |
| 5,228,983 A | * | 7/1993 | Nims | 210/521 |
| 5,503,747 A | * | 4/1996 | Vion et al. | 210/540 |
| 5,554,301 A | * | 9/1996 | Rippetoe et al. | 210/540 |
| 6,056,128 A | * | 5/2000 | Glasgow | 210/DIG. 5 |
| 6,079,571 A | * | 6/2000 | Stowell | 210/538 |

\* cited by examiner

*Primary Examiner*—Christopher Upton

(57) ABSTRACT

An apparatus for the removal of suspended solids and entrained oil from an aqueous solution is disclosed. The apparatus comprises a vessel having a top, bottom, side walls and end walls, with a flow inlet aperture at an upstream end and a flow outlet aperture at a downstream end. A first baffle extends downwardly from the top of the vessel downstream of the inlet and a second baffle extends upwardly from the bottom of the vessel downstream of the first baffle, with a first hopper for solids collection located upstream of the second baffle and a second hopper downstream of the second baffle. A removable coalescing media pack is located downstream of the second hopper, while a plurality of angled plates are located downstream of the coalescing media pack. A third baffle extends downwardly from a position proximate to the top of the vessel downstream of the angled plates, a fourth baffle extends upwardly downstream of the third baffle, while a fifth baffle extends downwardly between the fourth baffle and the outlet. A third hopper is located in upstream of the fourth baffle and a fourth hopper is located downstream of the fourth baffle. A chamber for the collection of oil is located in the top of the vessel between the third and fifth baffles.

6 Claims, 2 Drawing Sheets

APPARATUS FOR THE REMOVAL OF SUSPENDED SOLIDS AND ENTRAINED OIL FROM AN AQUEOUS SOLUTION

CROSS REFERENCES TO RELATED APPLICATIONS

Not applicable

STATEMENT REGARDING FEDERALLY SPONSORED RESEARCH AND DEVELOPMENT

Not applicable

BACKGROUND OF THE INVENTION

In many chemical extraction processes, oil based substances and aqueous solutions are mixed for various reasons. In most cases these oil based substances must be recovered for economical and environmental concerns. The aqueous solution must be cleaned of suspended solid contaminates as well as entrained oil before the aqueous solution is reused in the process or returned to the aquifer. If the aqueous solution is to be dumped into an ocean, stream or municipal treatment system, high environmental standards must be maintained. Stringent governmental laws and environmental concerns have increased the need for such equipment in a wide variety of industries and applications. This invention is capable of sustained operation in high turbidity applications and has excellent oil recovery efficiencies and suspended solids removal abilities.

The purpose of this invention is to provide industry with cost effective coalescing equipment for use in various applications that are subject to unusually high concentrations of suspended solids. A coalescer that requires a minimum amount of maintenance on a yearly basis. A separator capable of selectively removing suspended solids pre and post coalescing media for separating immiscible liquids on a continuous basis. A coalescer designed with a removable coalescing media pack which can be easily removed from the vessel and re-installed in a nominal amount of time. A coalescer that has means for automatically cleaning the coalescing media of accumulated solids at predetermined intervals.

1. Field of the Invention

This invention relates generally to the field of coalescing and more particularly to an apparatus for the removal of suspended solids and entrained oil from an aqueous solution. As more aqueous solutions are used in industrial applications the risk of ground water contamination has increased. Stricter environmental rules and regulations are forcing these industries to recover contaminates from the ground water used in theses aqueous solutions before discharging the recovered water from their plants.

2. Description of the Related Art

Many devices have been proposed for coalescing oil from aqueous solutions. Such known apparatuses have not been completely satisfactory, primarily due to the difficulties associated with suspended solids contained in the fluid streams and the high cost of maintaining or replacing the coalescing media, the apparatus and/or the ability of the apparatus to adequately separate the immiscible liquids while still maintaining reliability and service factors. Such known apparatuses often perform an adequate separation function when suspended solids in the fluid stream are under five milligrams per liter. These same apparatuses have not been satisfactory for continuous flow processing when suspended solids are above five milligrams per liter without the use of expensive, high maintenance filtration systems or removing and manually cleaning the coalescing media. In high rate flow applications of up to 3,000 GPM, the coalescing media quickly fouls with accumulated solids and the recovery efficiencies are less than desirable considering the capital investment required for the equipment. In these high flow rate applications filtration is not practical due to the large quantity of suspended solids found in the process fluid stream which must be continually removed on a daily basis if one wishes to forestall fouling of the coalescing media.

BRIEF SUMMARY OF THE INVENTION

This is an apparatus for the removal of suspended solids and entrained oil from an aqueous solution comprising a coalescing media pack of oleophilic and oleophobic material either of wire mesh or corrugated in design and an air operated cleaning unit consisting of strategically placed spargers throughout the coalescing media pack which agitates the accumulated solids with bursts of air bubbles, thus releasing the solids into the fluid stream. A set of one or more angled plates with vertical oil collection/transfer tubes is located downstream of the coalescing media pack to enhance removal efficiencies of the coalescer. The vessel has rigid sides with a flow inlet at an upstream end and a flow outlet at an opposite downstream end, both of which are specifically designed to reduce turbulence in the fluid. The apparatus has a rigid top with two openings, one at each end, to contain the inlet and outlet. There are five strategically placed rigid baffles for fluid flow and a rigid floor with openings to accommodate four solids collection hoppers, three of which are covered by perforated plates. A third raised opening is located in the rigid top of the vessel through which a self cleaning removable coalescing media pack is inserted into the vessel between the laterally spaced apart sidewalls directly in the fluid flow path. The third vertical baffle does not contact the top of the vessel and prevents solids and oil droplets from directly exiting the coalescer. A fourth opening is located in the top adjacent to the outlet to accommodate an oil collection chamber in which a weir is used to control the discharge of collected oil.

The primary object of the invention is an apparatus for removal of suspended solids and oil, with a coalescer designed for sustained operation under severe suspended solids conditions.

Another object of the invention is to provide industry with low maintenance cost effective coalescing equipment.

Another object of the invention is an inlet assembly specifically designed to reduce the velocity of the fluid with minimal disturbance.

Another object of the invention is that the inlet assembly is also a precoalescing vessel.

A further object of the invention is a coalescing media pack having an integrated media cleaning device that is capable of removing accumulated solids from the coalescing media.

Yet another object of the invention is that the coalescer is not removed from service while automatically cleaning the coalescing media pack.

Still another object of the invention is a coalescing media pack of oleophilic and oleophobic material of either wire mesh or corrugated design.

Yet another object of the invention is easy replacement of the coalescing media pack when necessary.

Another object of the invention is one or more angled plate assemblies located downstream of the coalescing media pack to enhance the oil and solids removal efficiencies of the coalescer.

Another object of the invention is a solids collection hopper located immediately downstream of the coalescing media pack, to collect solids during the cleaning of the coalescing media as well as during normal operation.

A further object of the invention is a controlled discharge of recovered oil not requiring instrumentation.

Still yet another object of the invention is to remove additional solids prior to the fluids exit from the vessel.

Another object of the invention is that the design of the coalescing vessel results in well above average oil and solids removal efficiencies.

A further object of the invention is that a low inlet pressure is required for successful operation of the coalescer.

Yet another object of the invention is an atmospheric discharge vessel which reduces manufacturing and operating cost.

Another object of the invention is an outlet assembly designed to increase the velocity without creating turbulence in the fluid for reintroduction to the process stream.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

Referring to the accompanying drawings.

DETAILED DESCRIPTION OF THE PREFERRED EMBODIMENTS

Figure 1:
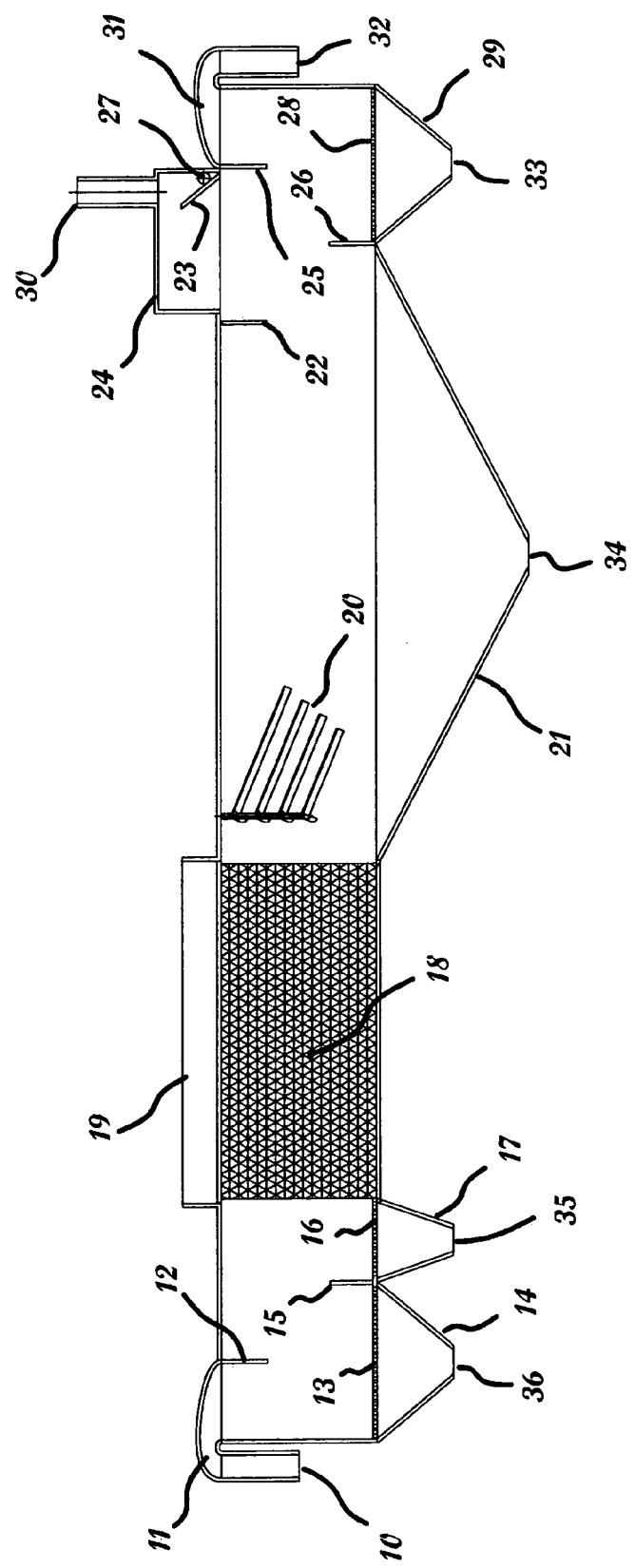
FIG. 1 is a cross section view of the invention.
Figure 2:
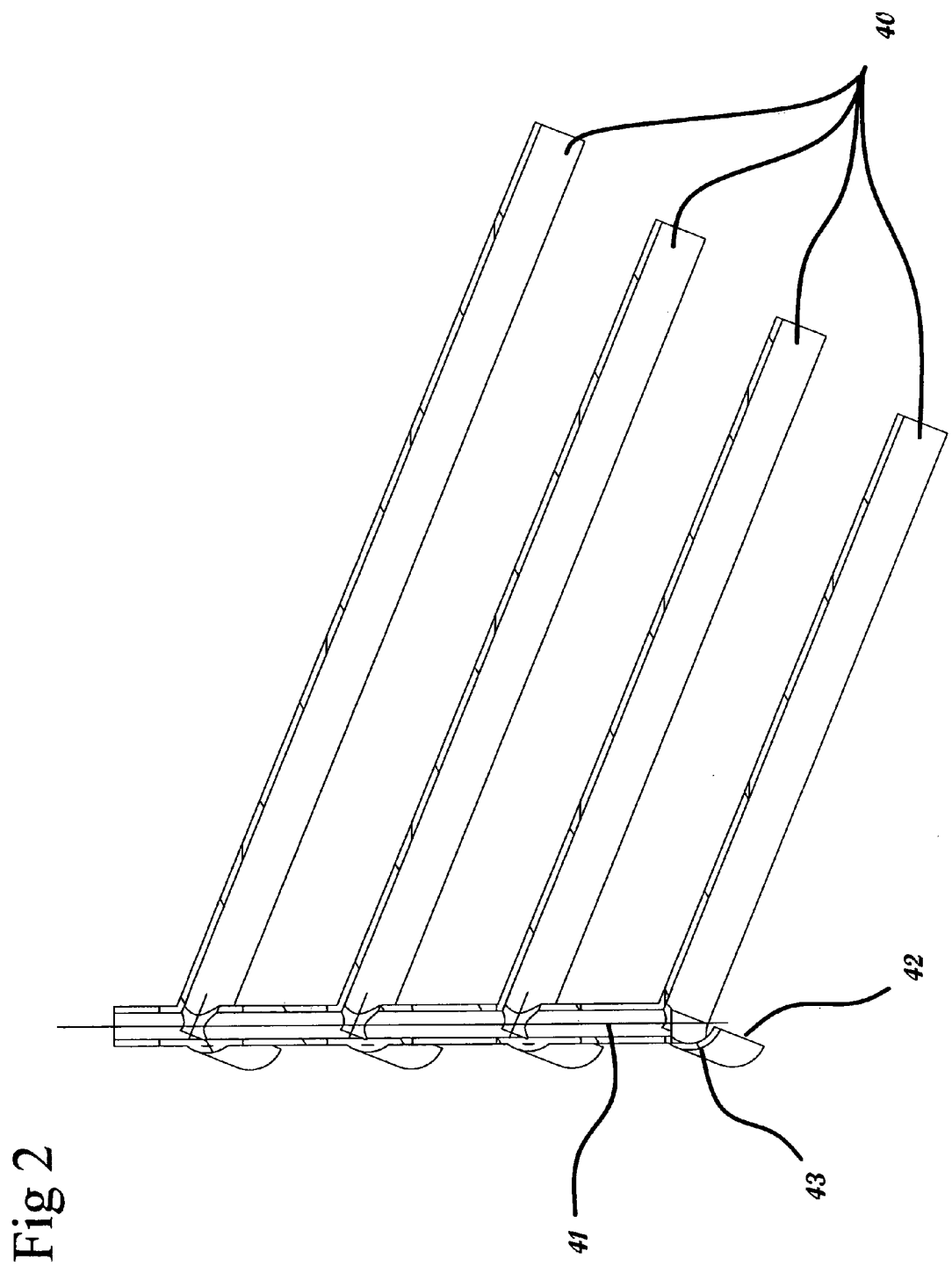
FIG. 2 shows a detailed cross sectional view of the angled plate assembly.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

This is an apparatus for the removal of suspended solids and entrained oil from an aqueous solution which brings together a unique combination of items resulting in a new and highly effective coalescing equipment.

Referring to the drawings, this invention comprises a coalescer having entrained oil removal, solids-removal, a removable coalescing media pack and a coalescing media cleaning device. The apparatus comprises an inlet aperture 10 where the aqueous solution having entrained oil and solids enters the inlet assembly 11, which reduces the velocity of the fluid without creating turbulence. The inlet assembly 11 is also used as a precoalescing vessel.

As the fluid enters the vessel, vertical baffle 12 ensures downward flow. The suspended solids now affected by gravity continue downward and become trapped beneath the first perforated plate 13 and are contained in the solids collection hopper 14 located at the bottom of the vessel.

The second baffle 15, located between the first solids collection hopper 14 and second solids collection hopper 17, blocks many of the solids from directly entering the coalescing media pack and channels the flow of fluid upward carrying the entrained oil with it. The second perforated plate 16 and second solids collection hopper 17 affords additional solids collection before the fluid enters the coalescing media pack.

The coalescing media pack 18 is recessed below the top edge of the containment well 19. The coalescing media pack 18 may be comprised of oleophilic and/or oleophobic materials of corrugated or wire mesh design. The coalescing media pack 18 has a solids agitation cleaning device integrated into the coalescing media pack, comprising evenly spaced spargers in which a pressurized fluid, air or gas, is used. The spacing of the spargers is dependent upon the type of media used and the density of the coalescing material. When the cleaning device is activated, the cleaning device agitates the solids that have accumulated on the coalescing media. When these accumulated solids break free from the coalescing media they are carried downstream and exit the coalescing media pack 18. The solids will gravity settle into the solids collection hopper 21 located immediately downstream from the coalescing media pack 18. If the solids are saturated with oil they will rise and exit the vessel through the oil collection chamber 24 and flow over the weir 23.

The angled plate assembly 20 which is located immediately after the coalescing media pack 18 is used to enhance the removal efficiencies of both entrained oil and suspended solids. A small curved lip 43 is added to the upstream edge of each angled plate 40. This creates a trough for the oil to travel to the vertical passageway 41. Each half of each angled plate 40 is also pitched down slightly, approximately 95 degrees from the vertically oriented vertical passageway 41. This improves the drainage of each plate half into the vertical passageway 41. As the oil collects on the angled plate 40, the oil will rise to the top of the vessel through the vertical passageway 41, which connects all of the angled plates in each assembly 20. The downstream fluid flow will carry the oil downstream to the oil collection chamber 24. The angled plate assembly 20 creates a gentle downward liquid flow causing additional suspended solids affected by gravity to drop out of the fluid and collect in the solids collection hopper 21 located below the angled plate assembly 20.

The third baffle 22 does not contact the top of the vessel. Baffle 22 prevents oil droplets from directly exiting the coalescer. Since baffle 22 does not contact the top of the vessel, accumulated oil will continue along the bottom side of the vessel's rigid top to the oil collection chamber 24.

The oil collection chamber 24 contains a weir 23 which is used to regulate discharge of the collected oil. A discharge aperture 27 is located in the side of the oil collection chamber 24. The collection chamber 24 also comprises a vent 30, thus allowing the bubbles created by the solids agitation cleaning device to vent to atmosphere during the media cleaning operation preventing pressurization of the vessel.

The fourth baffle 26 is located on the bottom of the vessel between the third solids collection hopper 21 and the fourth solids collection hopper 29. This fourth baffle 26 prevents solids from directly exiting the coalescer and ensures a slight upward fluid flow. The fifth baffle 25 located at the top of the vessel immediately after the oil collection chamber 24 prevents solids and oil droplets from directly exiting the coalescer. The fifth baffle 25 also ensures a downward fluid flow solids are then contained in the fourth solids collection hopper 29 below. Solids collection hoppers 14, 17, 21 and 29 comprise a means 33, 34, 35 and 36 for the discharging of collected solids. The outlet assembly 31 increases the velocity of the fluid without creating turbulence for reintroduction into the process fluid stream through the outlet aperture 32.

The design of this invention creates a quiet or dead zone in the coalescing vessel from the moment the fluid enters the vessel until the moment the fluid exits the vessel. This results in extremely high oil removal efficiencies, provides an excellent environment for the efficient removal of suspended solids from the fluid stream. The design of this invention will keep maintenance costs to a minimum and allow continuous successful operation of the coalescer in high turbidity conditions.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. An apparatus for the removal of suspended solids and entrained oil from an aqueous solution comprising:
   a vessel having a top, bottom, side walls and end walls, with a flow inlet aperture at an upstream end and a flow outlet aperture at a downstream end;
   a first baffle extending downwardly from the top of the vessel downstream of the inlet and a second baffle extending upwardly from the bottom of the vessel downstream of the first baffle;
   a first hopper in the bottom of the vessel upstream of the second baffle and a second hopper in the bottom of the vessel downstream of the second baffle;
   a removable coalescing media pack downstream of the second hopper;
   a plurality of angled plates downstream of the coalescing media pack;
   a third baffle extending downwardly from a position proximate to but not in contact with the top of the vessel downstream of the angled plates;
   a fourth baffle extending upwardly from the bottom of the vessel downstream of the third baffle;
   a third hopper in the bottom of the vessel upstream of the fourth baffle and a fourth hopper in the bottom of the vessel downstream of the fourth baffle;
   a fifth baffle extending downwardly from the top of the vessel between the fourth baffle and the outlet; and
   an oil collection chamber in said top of the vessel between the third and fifth baffles.

2. An apparatus according to claim 1, wherein said coalescing media is in the form of a corrugated or wire mesh pack of oleophilic and oleophobic materials.

3. An apparatus according to claim 1 and further comprising air sparger tubes within the coalescing media pack to clean the coalescing media pack.

4. An apparatus according to claim 1 and further comprising a weir within the oil collection chamber.

5. An apparatus according to claim 1 and further comprising at least one perforated plate covering at least one of the hoppers to confine collected solids therein.

6. An apparatus according to claim 5, wherein perforated plates cover the first, second and fourth hoppers.

* * * * *